Figure 4:
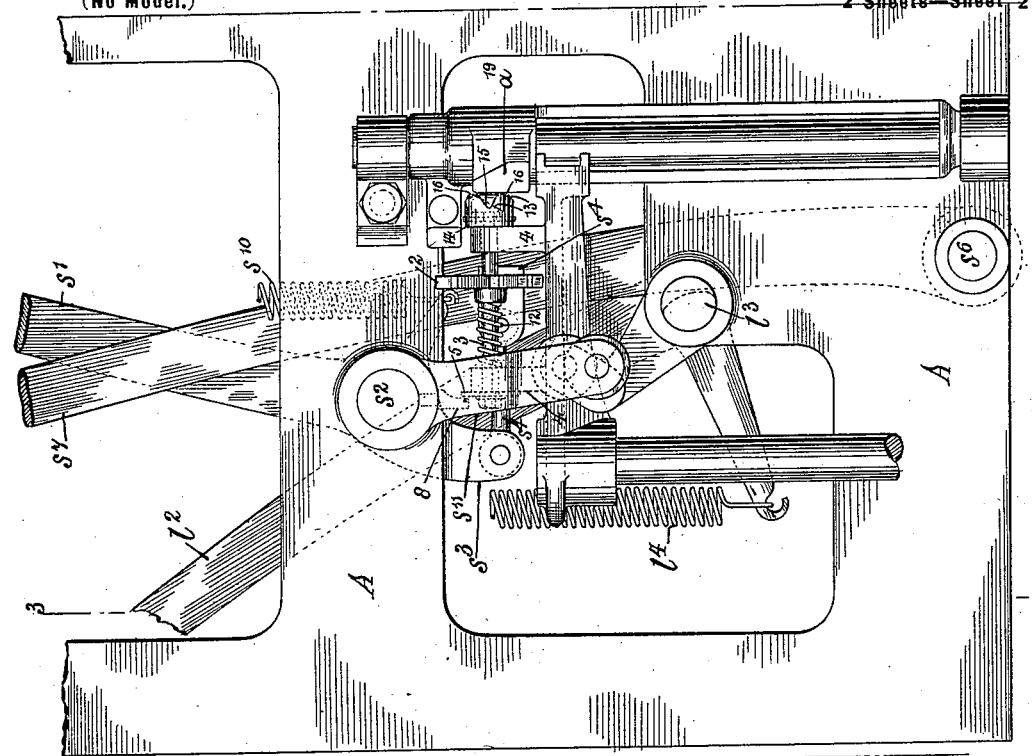

No. 645,472. Patented Mar. 13, 1900.
C. HOLLIWELL.
CASTING MECHANISM FOR LINOTYPE MACHINES.
(Application filed Sept. 9, 1899.)
(No Model.) 2 Sheets—Sheet 1.
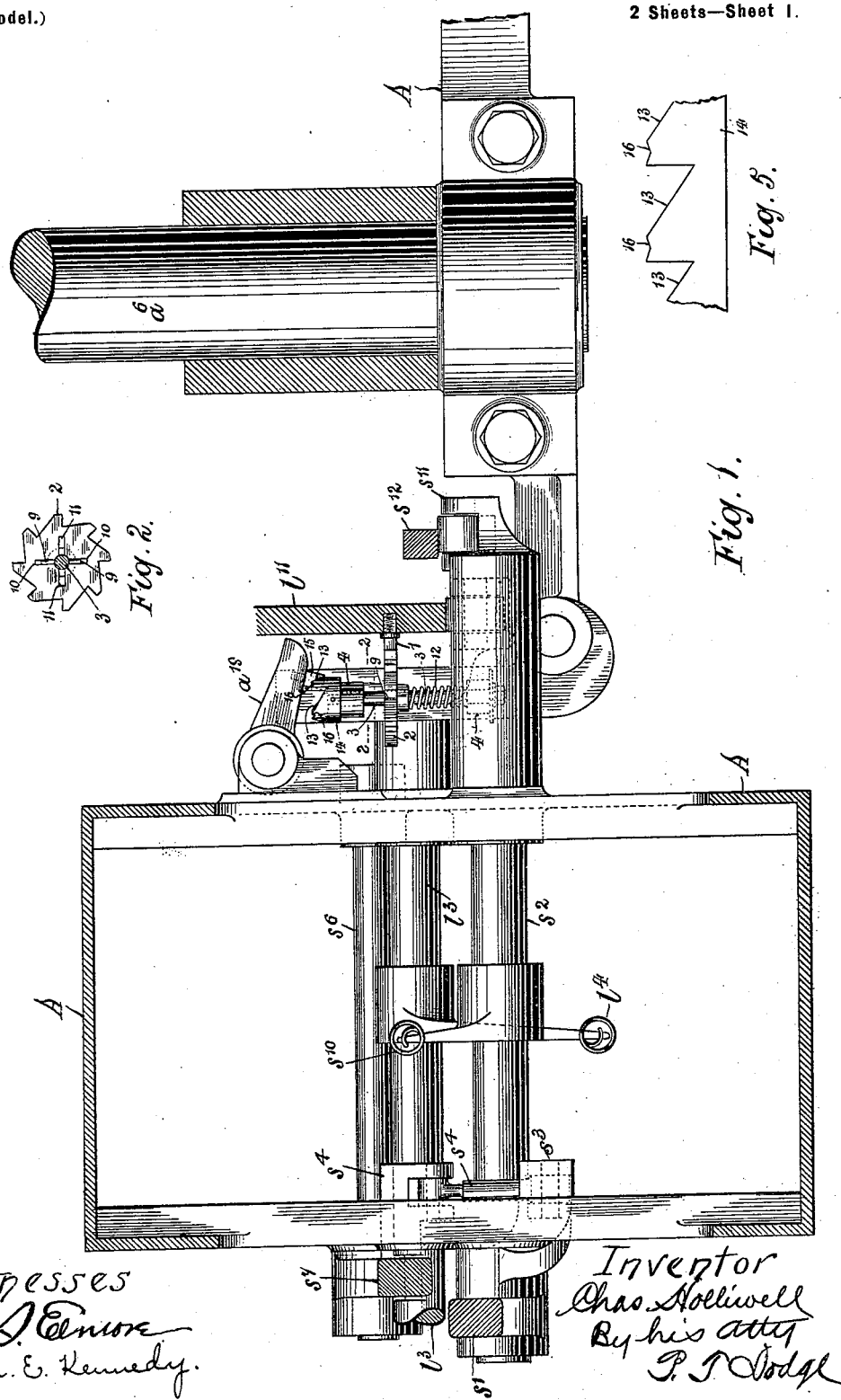

No. 645,472. Patented Mar. 13, 1900.
C. HOLLIWELL.
CASTING MECHANISM FOR LINOTYPE MACHINES.
(Application filed Sept. 9, 1899.)
(No Model.) 2 Sheets—Sheet 2.

Witnesses
Inventor
Chas. Holliwell
By his atty

UNITED STATES PATENT OFFICE.

CHARLES HOLLIWELL, OF BROADHEATH, ENGLAND, ASSIGNOR TO THE MERGENTHALER LINOTYPE COMPANY, OF NEW YORK, N. Y.

CASTING MECHANISM FOR LINOTYPE-MACHINES.

SPECIFICATION forming part of Letters Patent No. 645,472, dated March 13, 1900.

Application filed September 9, 1899. Serial No. 729,966. (No model.)

*To all whom it may concern:*

Be it known that I, CHARLES HOLLIWELL, of Broadheath, in the county of Chester, England, have invented certain new and useful Improvements in the Casting Mechanism of Linotype-Machines; and I do hereby declare the following to be a full, clear, and exact description of the invention, such as will enable others skilled in the art to which it appertains to make and use the same.

The present invention relates to improvements in the casting mechanism of the Mergenthaler linotype-machine which is fully described in the specification of Letters Patent No. 436,532, dated September 16, 1890, and in Patent No. 557,000, dated March 24, 1896. This machine can present its mold and cast many times from one composed line of matrices while the operator is composing the next line.

The object of the present invention is to make the said machine capable of automatically duplicating its production from one line of matrices and space-bars in order that two printing-machines may be kept supplied simultaneously with linotypes of the same matter, so that such a job as a pamphlet, that is wanted in the shortest possible time, may be divided between two printing-machines and worked off in half the time that one of them could do it in.

In the machine above mentioned the operator puts each composed line of matrices and space-bars within the grasp of a shifter (marked L L' in the specification above mentioned) and which transfers it horizontally to a member known as a "yoke" or "transporter" or "first elevator" N. The latter moves down vertically and presents the line to the casting mechanism O, &c. After the linotype has been cast the transporter moves upward vertically beyond the level from which it started downward and stands still, while a second line-shifter S draws the said line out of it. This shifting of the matrix-line out of the elevator is the first step toward the distribution of the matrices and their restoration to the magazine, and therefore the line-shifting devices which remove the matrices after use may be considered a part of the distributing mechanism. The transporter N then moves downward to aline itself with the first-mentioned shifter L L'. After the second-mentioned line-shifter S has drawn the composed line out of the transporter N the distributer takes the matrices out of the line and the space-bar grabber $u$ draws the space-bars into the space-bar magazine. None of the above parts form any part of the present invention, and for that reason they are not included in the accompanying drawings.

The present invention consists in automatic means combined with the machine for controlling the action of the shifting devices, so that the matrix-line will remain in the transporter or elevator and be presented a second time to the mold before the shifting and distributing devices are permitted to act. In the preferred form shown in the drawings I combine with one of the cams, making a revolution for each linotype cast, a projection, a toothed wheel actuated thereby, and a stop on said wheel to lock the matrix-shifter and space-bar grabber in their idle positions until a second linotype has been cast from the one line of matrices, automatic means being provided for unlocking them at the proper time.

Figure 3:
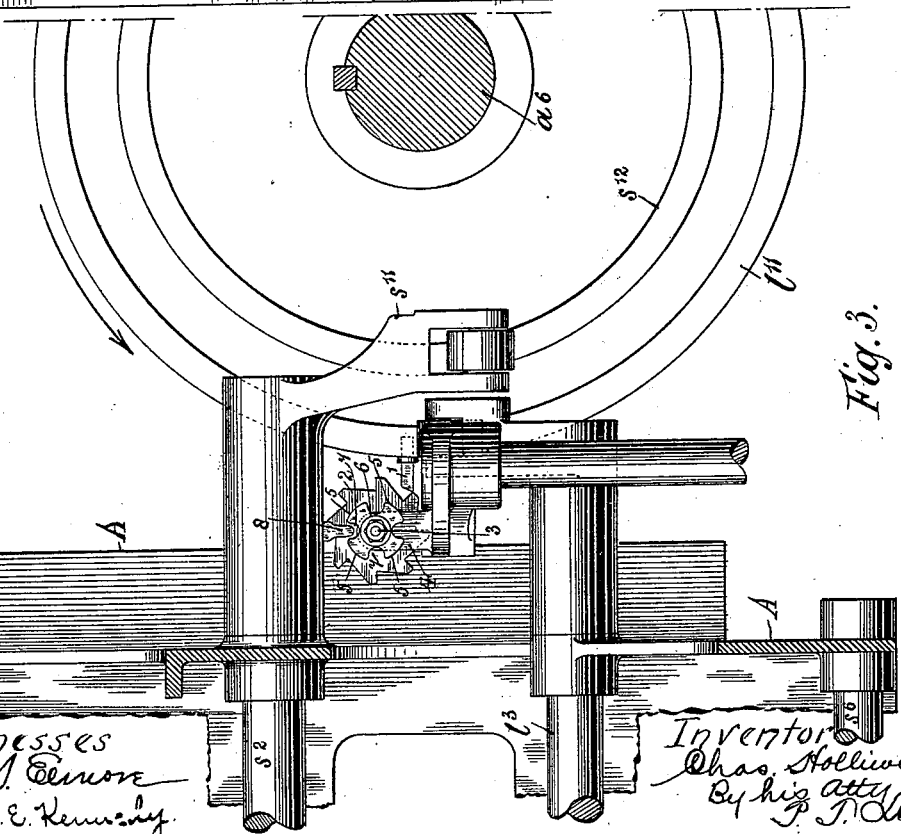

Referring to the accompanying drawings, Figure 1 is a plan looking at the machine from the right hand; Fig. 2, a sectional elevation on the line 2 2 of Fig. 1, looking from the left hand of the machine; Fig. 3, a sectional elevation from the right-hand side of the machine on the line 3 3 of Fig. 4; Fig. 4, a rear elevation, and Fig. 5 a development of the cam-boss and cam-surfaces for preventing the stoppage of the casting and ejecting mechanism.

A A are parts of the machine-frame; $a^6$, the cam-shaft; $a^{19}$, an elbow-lever fulcrumed on the frame A; $l^{11}$, a cam keyed on the shaft $a^6$ and revolving in the direction indicated by the arrow; $l^2$, the lever that works the first-mentioned line-shifter; $l^3$, the shaft on which it is fulcrumed; $l^4$, its actuating-spring; $s'$, the lever that works the second-mentioned line-shifter; $s^2$, a rock-shaft serving as its fulcrum; $s^3$, an arm fast to it; $s^4$, a connection from it to the lever $s^7$ to hold the latter to the lever $s'$; $s^6$, the fulcrum of the lever $s^7$; $s^7$, the lever that works the space-bar grabber; $s^{10}$, the spring that returns the two levers $s'$ $s^7$; $s^{11}$, a continuation of the lever $s'$ on the opposite side of the fulcrum $s^2$, and $s^{12}$ a cam fast on the shaft $a^6$ to actuate the levers $s'$ and $s^7$ by engaging an antifriction-roller on the end of the continuation $s^{11}$.

All the parts just described are substantially as described in the above-mentioned Patent No. 436,532, and are marked with the same reference letters and figures to facilitate identification of them.

1 is the above-mentioned projection. It is made fast to the periphery of the cam $l^{11}$, from which it projects radially.

2 is a toothed wheel capable of a sliding motion along the shaft 3, but incapable of turning independently of the latter. This shaft is parallel with the shaft $a^6$ and turns in fixed bearings 4 4.

5 5 5 5 are stops symmetrically arranged on a boss 6, fast on the shaft 3 and having as many notches 7 between them.

8 is a stud fast to the boss of the continuation $s^{11}$, and therefore moving or standing still with the lever $s'$. The wheel 2 presents either a stop 5 or a notch 7 in the path of the stud 8. Each of the stops 5 is strong enough to stop the lever $s'$ and each of the notches 7 large enough to let the stud 8 swing through it.

9 is a pin projecting for the same distance from opposite sides of the shaft 3 and fast to it.

10 is a groove in the left face of the wheel 2. It is long enough and wide enough to stand over the pin 9, but shallow enough to prevent the wheel 2 sliding along the shaft 3 to the left far enough to carry it past the path of the projection 1.

11 is a second groove in the same face of the wheel 2, but at right angles with the groove 10. It is deep enough for the wheel 2 to be moved along the shaft 3 to the left far enough to carry it past the path of the projection 1.

12 is a spring on the shaft 3, resilient between the right-hand bearing 4 and the boss of the wheel 2 to keep the latter engaged with the stud 9. The engagement of the latter in either of the grooves 10 or 11 locks the wheel to the shaft 3.

13 13 are equal and equidistant cam-surfaces carried by a boss 14, fast on the shaft 3.

Reference to the above-mentioned patent will show that a linotype is cast at each revolution of the cam-shaft $a^6$ and that the latter is then automatically stopped by the lever $a^{19}$.

15 is a wedge-shaped projection fast on the lever $a^{19}$, so positioned thereon as to stand in the path of one of the cam-surfaces 13.

16 16 are notches, one following each cam-surface, to lock the lever $a^{19}$ by receiving the edge of the projection 15.

The invention acts as follows after the wheel 2 has been set with the shallow groove 10 over the pin 9 by hand: As the projection 1 comes round it engages the particular tooth of the wheel 2 that is standing in its path at the moment and turns it about its axis for the distance of one tooth, thereby presenting a stop 5 in the path that the stud 8 will take the next time the lever $s'$ is rocked. The cam $l^{11}$ then proceeds on its revolution, as heretofore. When the transporter reaches the top of its stroke, the line of matrices and space-bars is not drawn out of it, but is taken back by it and then to the casting mechanism as if it were a fresh one from the first-mentioned line-shifter. Fracture of any part of the mechanism connected with the levers $s'$ $s^7$ is prevented by the compensating device heretofore present in it, so that a special one is not required by the present invention. When the projection 1 locked the lever $s'$ in the way just described, it made the particular cam-surface 13 that was then in contact with the projection 15 rock the lever $a^{19}$. This contact begins between the middle of the said cam-surface and the edge of the projection, as shown in Fig. 4, and continues until the lever $a^{19}$ has been rocked far enough to the left to prevent it acting, at which moment the respective notch 16 stands opposite the edge of the projection 15 and receives it, thereby locking the lever $a^{19}$ in its inoperative position. The edge of the projection 15 is forced into the notch 16 by a spring. (Not included in the drawings.) As long as the lever $a^{19}$ remains in the position just described it will fail to automatically stop the shaft $a^6$ at the end of the revolution of the latter, so that it will start on a second one and during that second revolution the duplicate linotype will be cast. Each second contact of the projection 1 with the wheel 2 will make the latter present a notch 7 in the path of the stud 8, so leaving the levers $s'$ $s^7$ free to act normally, and will also make the shaft 3 disengage the cam-notch 16 from the projection 15, which is immediately forced up to the next cam-surface 13, thereby allowing the lever $a^{19}$ to swing back into its operative position.

I believe myself to be the first to provide a linotype-machine with automatically-acting mechanism through which the retention of the line of matrices in operative position is effected and its distribution prevented until the line has been used for the production of two duplicate linotypes. In other words, I believe myself to be the first to incorporate in a linotype-machine automatically-acting mechanism causing two linotypes to be cast in succession from one line of matrices, and thereafter causing automatically the distribution of the matrices. It will be manifest to the skilled mechanic that the details of construction can be variously modified, the only essential requirement being that the stop devices or devices to control the action of the distributing mechanism should be connected with and driven from a suitable part of the machine and that they shall act automatically first to arrest the distribution and thereafter to permit the distribution after the second linotype has been cast.

What I claim is—

1. In combination with a linotype-machine, an automatic supplementary mechanism, acting to prevent the shifting of each matrix-line until a second linotype has been cast therefrom, whereby linotypes may be produced in duplicate.

2. In a linotype-machine, and in combination with a shaft from which the casting and matrix-distributing mechanism are driven, a supplemental mechanism, also driven from said shaft and constructed to prevent every alternate action of the matrix-distributing devices, whereby each line of matrices is left in position for the casting of a second linotype therefrom.

3. In a linotype-machine having matrix-dirtributing mechanism arranged to operate normally after each casting operation, a supplemental automatically-operating mechanism, to prevent every alternate action of the line-shifting mechanism; whereby the machine may be caused to automatically produce linotypes in duplicate.

4. In a linotype-machine, a supplemental mechanism adapted to be thrown into and out of action at will, and acting when in use to cause the retention of each matrix-line in operative position until a second linotype has been cast therefrom and thereafter automatically releasing the distributing mechanism.

5. In a linotype-machine and in combination with the shifting-levers and actuating mechanism therefor, the rotary notched stop driven by the machine and acting to hold the levers out of action periodically as described, whereby the casting of duplicate linotypes from each matrix-line will be effected.

6. In a linotype-machine, automatically-actuated mechanism, restraining the distribution of the matrix-line until a second linotype has been cast therefrom, and thereafter permitting the action of the distributing mechanism.

7. In a Mergenthaler linotype-machine, the combination of the line-shifter lever $s'$, the rotatable notched stop to arrest the action of said lever, and driving connections, substantially as shown, for imparting an intermitting rotation to said stop.

8. In a Mergenthaler linotype-machine, the combination of the rotary cam, provided with projection 1, the notched wheel 2, driven thereby, the notched stop 5, and the shifter-lever, having a projection 8 to encounter said stop, said parts timed and arranged as described to hold the shifter-lever at rest until the machine has completed two cycles and produced two linotypes from the one line of matrices.

In testimony that I claim the foregoing as my invention I have signed my name in presence of two subscribing witnesses.

CHARLES HOLLIWELL.

Witnesses:
T. TAYLOR,
ARCHIE LOWE.